United States Patent [19]

Lin

[11] 4,171,951

[45] Oct. 23, 1979

[54] MEANS FOR PRODUCING CEMENTITIOUS PRODUCT FROM QUENCHED FLY ASH

[76] Inventor: Ping-Wah Lin, 506 South Darling, Angola, Ind. 46703

[21] Appl. No.: 792,672

[22] Filed: May 2, 1977

Related U.S. Application Data

[63] Continuation of Ser. No. 684,188, May 7, 1976, Pat. No. 4,054,463.

[51] Int. Cl.² ............................................. F27D 15/02
[52] U.S. Cl. ......................................... 432/77; 432/80
[58] Field of Search ..................... 432/77, 80; 106/103, 106/118

[56] References Cited
U.S. PATENT DOCUMENTS

| | | | |
|---|---|---|---|
| 3,837,792 | 9/1974 | Deussner | 432/77 |
| 3,861,930 | 1/1975 | Lin | 106/109 |

Primary Examiner—John J. Camby
Attorney, Agent, or Firm—John A. Young

[57] ABSTRACT

A cementitious product is produced from a combination of two groups of materials: the first group consisting of lime or Portland cement or Linfan (which is defined as a thermally cracked shell of calcium sulfate surrounding a core of lime) or Linvein (a lime particle coated with cracked calcium carbonate); and a second material consisting of thermally cracked fly ash which is cracked by thermally quenching such finally divided particulate material from an elevated temperature at least above 300° C. and preferably higher than 450° C. to ambient or below ambient temperatures.

The two materials are blended together. They are mixed with water, placed in a form, and then allowed to cure. Filler materials can also be used in the form of sand, gravel, and other aggregates, depending upon the strength and compositional characteristics desired in the final product.

5 Claims, 8 Drawing Figures

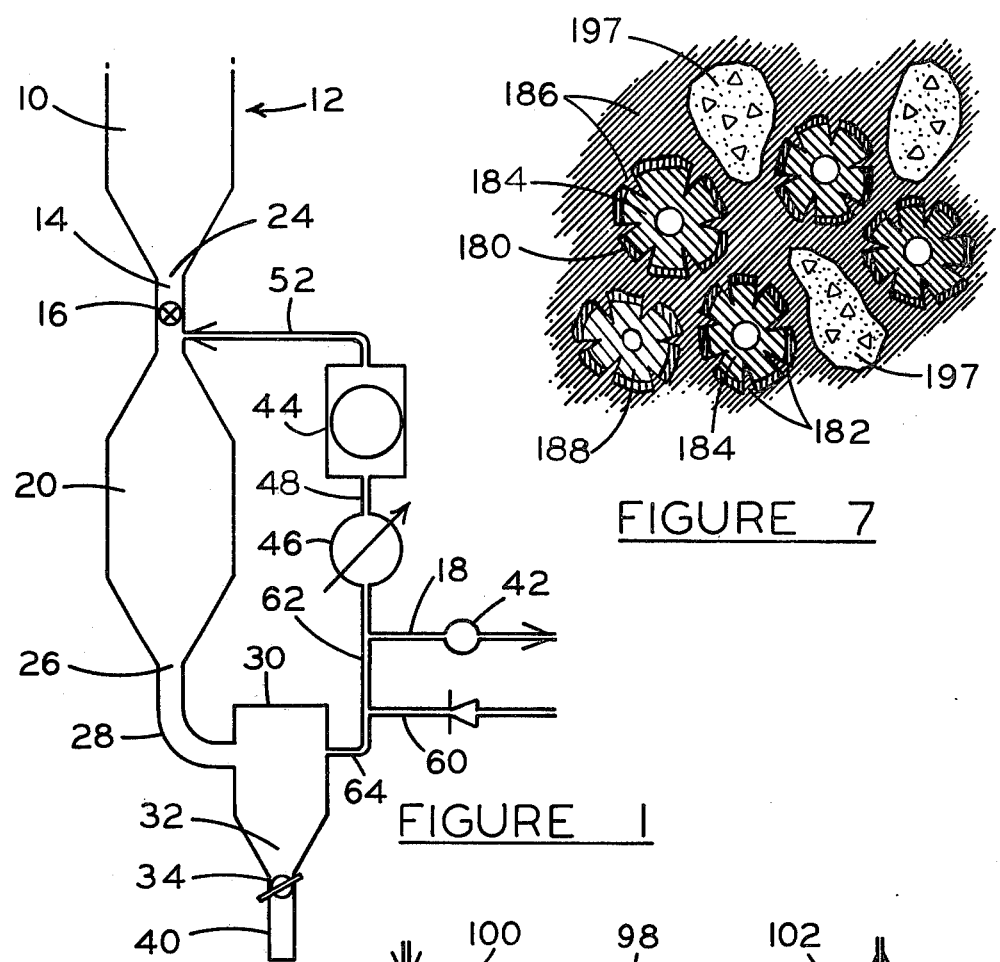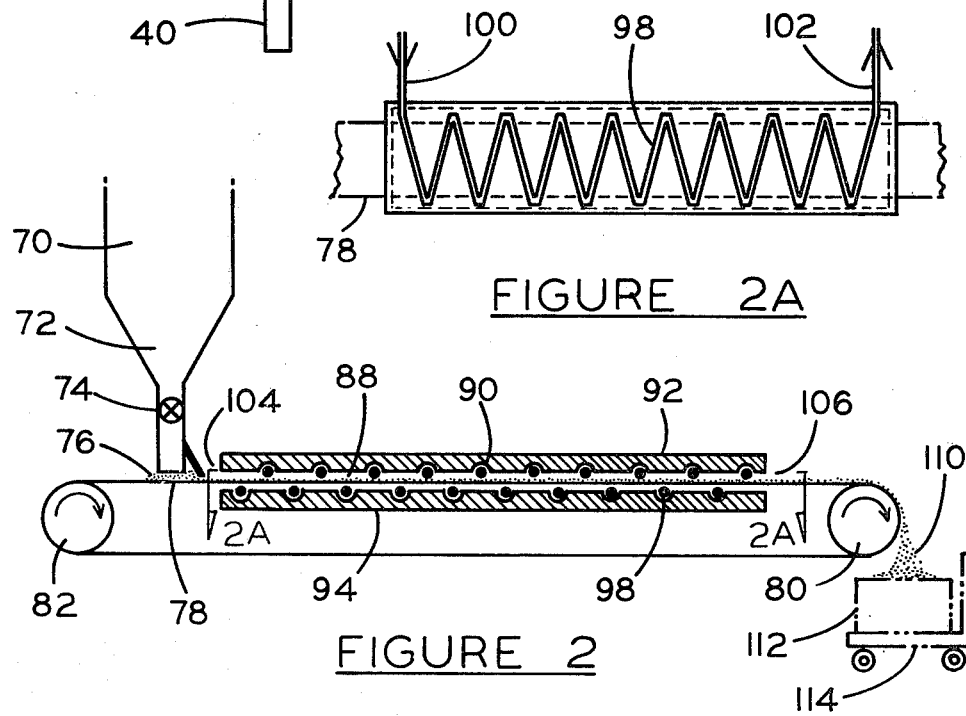

MEANS FOR PRODUCING CEMENTITIOUS PRODUCT FROM QUENCHED FLY ASH

RELATED APPLICATION

This application is a continuation application of previously filed Ser. No. 684,188 filed May 7, 1976 and entitled, "IMPROVED PROCESS FOR PRODUCING CEMENTITIOUS PRODUCTS FROM QUENCHED FLY ASH" now U.S. Pat. No. 4,054,463.

BACKGROUND OF THE INVENTION

In my issued U.S. Pat. No. 3,861,930, entitled "Construction Material," issued Jan. 21, 1975, I disclose a construction material which is a cementitious product produced from a combination of cracked outer layer of calcium sulfate and an inner core of calcium oxide, such material being particularly adapted for making plaster or blending with other products to make cementitious products and the like. In the present invention, it is desired to improve the quality of cementitious products by improving the curing rate and mechanical strength properties of cementitious products by more efficiently mechanically interlocking the material in the form of cracked fly ash and the chemically reactive lime, Linfan, Linvein, or cement.

Fly ash is a fine residue which is a by-product of the burning of powdered coal collected from the stacks of power plants and other coal burning installations by mechanical means, or by electrostatic precipitators and the like. It consists of a finely divided hollow particulate material high in siliceous, ferrous, and aluminous material and is reactive with lime to form a cementitious material. However, such material, in order to be adaptable for the uses of the present invention, is in need of having a high surface to volume ratio, and should have reactive surfaces either at the outer surface or below the surface reactive with lime, cement, Linfan, or Linvein. In order to bring this about, the fly ash is cracked by a continuous process or by batch process, by which the material is elevated in temperature and rapidly quenched to ambient or below ambient temperature. It is the finished quality of this cracked fly ash which makes it particularly adapted for use in this invention. This invention also has to do with the particular method and apparatus for effecting this quenching by a continuous and economical process.

OBJECTS OF THE INVENTION

One of the principal objects of the present invention is to provide an improved cementitious product having superior strength and cure properties in that by using cracked fly ash it is possible to provide a more reactive surface with lime. The characteristics of improved fly ash are such that it has high surface to volume ratios, highly reactive with the lime, which also produces a unique interlocked cementitious material resulting from the reaction with the lime in the production of the final cured cementitious product. Consequently, in the final cured product, there is a unique interlocking of particles which contributes to improved compressive strength.

A further object of this present invention is to produce a series of novel apparatus and methods for effecting cracking of fly ash in a continuous manner whereby any randomly obtained fly ash obtained by electrostatic precipitation or mechanical collection in the stacks of fossil fuel burning plants can be readily treated in a continuous manner to produce the characteristic cracking as used in the present invention.

Other features and advantages of the present invention will become apparent from a consideration of the following description which proceeds with reference to the accompanying drawings.

DRAWINGS

FIG. 1 is a plan view of an apparatus for effecting continuous thermal cracking of fly ash in accordance with the present invention, constituting one embodiment of the invention;

FIG. 2 is a plan view of an apparatus for continuously effecting treatment of fly ash, constituting a second embodiment of the invention;

FIG. 2A is a section view taken on line 2A—2A of FIG. 2;

FIG. 7 is an enlarged schematic view showing the particulate fly ash, Linfan, Linvein or cement in the final cementitious product.

DESCRIPTION OF PREFERRED EMBODIMENTS

Figure 3:
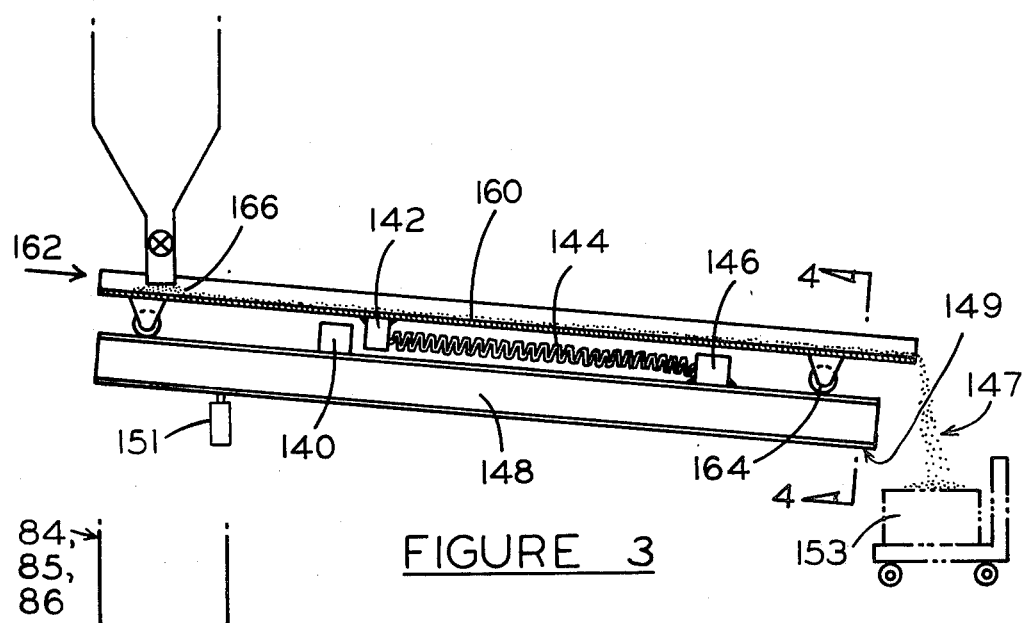
FIG. 3 is a side elevation of the quenching plate.
Figure 4:
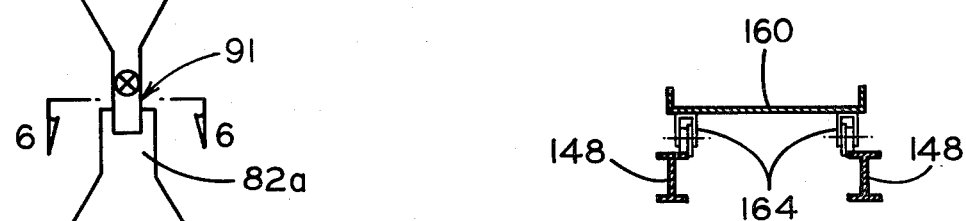
FIG. 4 is a section view on line 4—4 of FIG. 3.

Fly ash, which is a very fine residue produced from the combustion of coal, is available in large quantities being collected in electrical power plants and other installations by mechanical and electro-mechanical means, as one of the starting materials. Typically, these fly ash particles are very small, the usual particle size being about 80% passing through a 325 mesh sieve or less than 45 $\mu$m diameter with an elemental analysis showing calcium, silicon, iron, aluminum and sulfur in major proportions with minor proportions of other elements. The sulfur concentration of fly ash is related to the size of the fly ash according to Davison et al ("Trace Elements in Fly Ash," Volume 8, No. 13, December 1974, *Environmental Science & Technology*). Sulfur exhibits an increase of concentration with decreasing particle size and is 4.4 and 7.8% for particles of diameters 10–15 $\mu$m and 5–10 $\mu$m respectively. For fly ash with diameters higher than 15 $\mu$m and smaller than 5 $\mu$m the sulfur concentration is negligible.

Dwight K. Smith found (Utilization of Fly Ash in Cementing of Wells, Fly Ash Utilization, Proceedings, Edison Electric Institute, National Coal Association, Bureau of Mines Symposium) that over 80% of the fly ash collected from seven different utility companies pass No. 325 sieve, or less than 45 $\mu$m.

If thermal shock is applied to fly ash, it is possible to crack the sulfur-bearing coatings of smaller particles and surfaces of different chemcial compositions of larger particles. The sudden temperature drop should be greater than 300° C., preferably greater than 450° C. Fly ash temperature coming out from electrostatic precipitator in conventional power plants is in the range from 150° C. to 350° C. In order to cause cracks formed on fly ash, power plant design should be slightly modified so that the temperatures of the exiting fly ash are above the desirable level. Thermal cracks can also be induced on the fly ash collected from conventional power plants by reheating the fly ash to the desirable temperature and quenching rapidly.

In accordance with the present invention, the fly ash is cracked by quenching in order to make accessible to a chemically reactive subjacent layer consisting of aluminum oxide, ferrous oxide and calcium oxide. The coating which is cracked is mostly calcium sulfate. In case the fly ash does not have a calcium sulfate coating, cracking also increases the total reaction area, facilitating diffusion relative to the reactive subjacent layers and in the presence of lime, the cementitious materials formed are thoroughly interlocked with fly ash or its equivalent. Consequently, by reason of this diffusion and mechanical interlock, the finished product has higher compressive strength.

The quenching is performed continuously in accordance with the apparatus indicated in FIGS. 1 and 2.

Referring first to FIG. 1, in this case, the invention has the primary advantage of conveying fly ash through the apparatus in the absence of "bridging of particles or the like." Fly ash is continuously or semi-continuously fed into a hopper 10 of a furnace or electrostatic precipitator designated generally by reference numeral 12. At the discharge 14 is a rotary or screw feeder 16 with a cool air line in vacuum line 52 disposed vertically just below the rotary feeder or screw feeder 16. The fly ash is inducted under differential pressure into a quenching chamber 20, thus avoiding "bridging" at the reducing diameter end 24. The system is kept under sub-atmospheric pressure for preferred operation.

This is the case regardless of what powder is to be used, whether it is fly ash or any other powder, Linfan, Linvein, or the like. The heated fly ash then enters the quenching chamber 20 which has a sufficient diameter so that the powder settles vertically downward in a rather slow rate. There is sufficient time so that the quenching will effect a series of cold induced fractures on the outer surface of the particles. By the time the fly ash reaches the base 26 of the quenching chamber 20, it is fully cracked. The cracked fly ash is led through outlet line 28 to a chamber 30 having a filter or filters 32 with a discharge valve 34 providing a continuous or intermittent discharge through outlet line 40. The removal of the fly ash from the filter surface can be done by reversing the clean air or by mechanically rapping.

Vacuum line 18 connects with a continuously operative vacuum pump 42 or intermittently operated vacuum pump sufficient to maintain a vacuum of necessary and desired value to the system to effect induction of the fly ash from the reactor discharge 14 into the quenching chamber 20. While vacuum conditions are preferred, they are not essential.

A fan 44 produces forcible circulation of cool air from cooler 46, the cooled air being circulated through line 48 and 52 to the quenching chamber.

Make up air is provided from a make up line 60 leading to line 62, having filtered air from line 64, then leading from the filter 32, is recycled through line 64 and 62, 48 and 52. The line 60 can restore from subatmospheric pressure to atmospheric pressure in the system.

Referring next to FIG. 2, in another embodiment of the invention, the reactor or the furnace or electrostatic precipitator 70 provides through its base 72 and rotary feeder or screw feeder 74 a discharge of heated Linfan, Linvein, or fly ash material designated generally by reference numeral 76 which is disposed upon a continuous travelling belt conveyor 78 which travels endlessly between roller 80 and 82. The powder 76 is thinly spread across the width of the belt 78 which is covered with or made of thermally conductive material, such as aluminum or copper in the form of a very thin plate or wire mesh interwoven with flexible heat resistent material. The heat from the powder can be rapidly transferred and uniformly distributed over the entire surface of the heat conductive conveyor belt so that within quenching chamber 88, the maximum impact of air quenching can be communicated to each of the finely divided particles. The finely divided particles are spread evenly over the width and length of the belt and are periodically turned over and redistributed so that the surface of all of the powder is exposed to the quenching operation. It is known that fly ash is a poor heat conductor and in some instances, it is desired to mechanically redistribute the thickness of the fly ash so that all portions of the fly ash are uniformly exposed to the heat conductive surface in the quenching operation. Within the quenching chamber 88 are spaced grooves 90, cooling plates 92, 94, there being cooling coil 98, inlet 100 and outlet 102 for refrigerant. The fly ash travels on the belt from the entry end 104 to the exit end 106 and is rapidly and thoroughly quenched from a temperature above 300° C., preferably above 450° C. to ambient or below ambient temperature. The effect of this rapid quenching is to induce fractures on the surface, thereby exposing the subjacent layers of the fly ash, such subjacent layers typically consisting of aluminum oxide, ferric oxide and calcium oxide or combinations of such oxides. Particularly, any calcium sulfate coating is thoroughly cracked to provide access to the subjacent sections of material.

As the conveyor belt changes direction by passing over pulley 80, the cracked fly ash or other powder designated by reference numeral 110 is collected and packaged in a container 112 on a conveying vehicle 114 and is thereby moved to a point of use.

Referring to FIG. 2, heat dissipated from the belt and quenched material is removed by the cooling system. The cooling system may be insulated from the ambient air by suitable insulative materials, such as fiberglass or glass foam.

The quenching rate can be readily made a matter of design preference by determining the rate of movement of the fly ash on the belt to the chamber, this in turn is readily controlled by the belt speed. The temperature gradient is determined by the rate of cooling, which is also regulated by the rate of circulation of the refrigerant through the cooling coils.

Advantages of the quenching system are: low initial cost, simple construction, quenching in a dry state with the output also variable and readily adjustable.

Referring to FIG. 3, an oscillating weight 140 contacts a block 142 which reacts against spring 144 pressed between block 142 and the second spaced member 146 which is fixed on the rail 148. As a result of the periodic impingement of the weight 140 by mechanical means against the block 142 by wheel 164 and causes the powder 166 to move by the influence of the spring 144 action and gravity force downwardly in the direction of the arrow 162 of the inclined plate, which also causes the concurrent turnover of the particles so that as the particles move from the inclined upper end to the inclined lower end of the plate, they will also be agitated to roll over, thereby bringing various ones of the particles against the confronting surface of the inclined plate. The particles move down on the inclined plate under the action of gravity and discharge as shown at 147 into container 153. The quenching is a function primarily of the total thermal gradient and secondarily related to the time allotted to quench the fly ash. Thus, if the fly ash 166 is sufficiently high in initial temperature, it need not be artificially cooled, providing the temperature differential between the heated condition of the particles and the quenching or cooling area is sufficient to procure sufficiently rapidly quenching to effect the thermal stress necessary for producing cracking of the particles. The cooling apparatus and method for quenching is useful not only for the quenching of the fly ash, but also other materials as well, such as the Linfan and Linvein as described in my previous U.S. Pat. No. 3,861,930.

With reference to FIG. 3, oscillation of the copper or aluminum plate 160 can be also done by electromagnetic force. Electric wire is wound around an iron block 140, which is firmly attached to the rail 148 or other stable structure. Electric current in the wire induces a magnetic field about the block which in turn attracts the induced magnet 142. When current is cut, block 142 recoils back under the influence of the spring force. As the electricity in the wire is periodically on and off, the copper plate oscillates back and forth, causing the powder to turn over and slide down the plate; thus, the heat from the powder can be rapidly transmitted to the high-heat conductive copper or aluminum plate and dissipated to the cool environment or absorbed by a cooling system. The rail 148 is hinged at end 149 and the pitch is varied by an adjusting jack 151.

Figure 5:
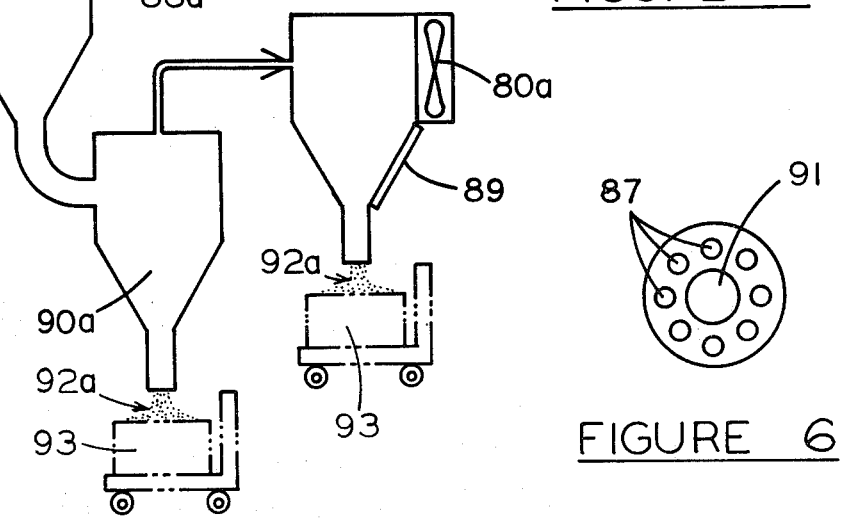
FIG. 5 is a further embodiment of the invention.
Figure 6:
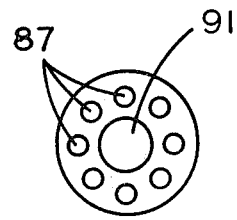
FIG. 6 is a section view taken on line 6—6 of FIG. 5.

FIG. 5 shows the quenching unit which operates on the principle of differential pressure. The fan 80 creates vacuum in the narrow passage 82 of the quenching chamber 83 which tends to draw in cool air as well as fly ash. The fly ash or other hot powders drawn from fly ash reheating unit 84 or high temperature electrostatic precipitator 85 or lime reactor 86 through a standpipe 91 which extends about six inches into the narrow section 82 of the quenching chamber. The fly ash is mixed violently in the narrow section 82 with the cool air drawn through holes 87 at the top of the quenching chamber. As the fly ash enters the quenching chamber proper 88 where the cross section area is large, the falling velocity of the particle is greatly reduced, given an opportunity to induce surface cracks on the fly ash. The surface cracked fly ash or other powder 92 can be collected by a cyclone 90 and then on filter 89. The powder is then collected in one or the other of containers 93. The powder 92 collected on the filter removed periodically by reversing the air flow or by rapping and packaged at the bottom of the hopper.

SPECIFIC WORKING EXAMPLES

Working Example 1: Linfans—Fly Ash—Aggregate Mixture

When surface cracked fly ash is mixed with Linfan, aggregates, upon the addition of water, Ca(OH)$_2$ in Linfans diffuses through the cracks of Linfans to react with the constituents of surface cracked fly ash to form cementitious materials. Because of fast diffusion in the cracks and the space between particles, the cementitious materials formed will be in the cracks, or in the space between the particles, and higher early and final compressive strength construction material will result. Table 1 shows the comparison of compressive strengths developed for Linfan-fly ash-aggregate mix using fly ash subject to (Samples E and F) and that not subject to (Sample D) quenching. The compressive strength of the samples were found after they were cured for seven days and then autoclaved at 15 psi for 16 hours. The compositions of samples D, E and F and their compressive strengths developed are shown in Tables 1 and 2 respectively. From the results, it is evident that the mix using fly ash quenched from 800° C. (Sample F) developed highest compressive strength. The compressive strength of Samples E and F are considerably higher than that of Sample D.

TABLE 1

COMPOSITIONS OF SAMPLES D, E AND F

| COMPOSITION | SAMPLE | | |
|---|---|---|---|
| | D | E | F |
| Linfans B1D | 5.8% | 5.8% | 5.8% |
| FA* | 12.2% | — | — |
| FA 500** | — | 12.2% | — |
| FA 800*** | — | — | 12.2% |
| Aggregate | 71.4% | 71.4% | 71.4% |
| Water | 10.6% | 10.6% | 10.6% |

*Ordinary fly ash from Dayton Power Co., Dayton, Ohio.
**FA (fly ash) heated gradually to 500° C. and then quenched rapidly to room temperature.
***FA (fly ash) heated gradually to 800° C. and then quenched rapidly to room temperature.

TABLE 2

| COMPRESSIVE STRENGTH DEVELOPED* | |
|---|---|
| SAMPLE | COMPRESSIVE STRENGTH |
| D | 620 psi |
| E | 1,500 psi |
| F | 1,910 psi |

*Cured for 7 days and then autoclaved at 15 psi for 16 hours.

Working Example 2: Cement—Fly Ash—Aggregate Mix

When cement is mixed with fly ash, aggregates and water, the excess lime in cement reacts with aluminum, iron, and silicon in fly ash to form cementitious materials which cause an increase of the strength of concrete product. Cement—fly ash—aggregates mix samples were prepared and tested. The composition of the samples and testing results are shown in Tables 3 and 4 respectively. The fly ash used in sample preparation are ordinary fly ash, fly ash heated to 500° C. and 800° C. respectively and quenched rapidly to room temperature. From the results, in Table 4, it is evident that sample I has lower 7 day and 28 day compressive strength than samples J and K. The 28 day compressive strength of sample J is 22.4% higher than that of sample I, and the 28 day compressive strength of sample K is 34.6% higher than sample I. In other words, the increase of strengths due to quenching of fly ash from 500° C. and 800° C. are 22.4% and 34.6% respectively. This proves beyond any doubt that quenching operation induces surface cracks of fly ash which in turn facilitate the chemical reactions between excess lime of cement and the chemicals in the subjacent layer of fly ash. When surface cracked fly ash is used in concrete mix, a higher 7 day and 28 day strength concrete product is produced.

TABLE 3

COMPOSITION OF SAMPLES I, J AND K

| COMPOSITION | SAMPLE | | |
|---|---|---|---|
| | I | J | K |
| Portland cement Type 1 | 9.8% | 9.8% | 9.8% |
| FA* | 4.3% | — | — |
| FA 500** | — | 4.3% | — |
| FA 800*** | — | — | 4.3% |

TABLE 3-continued

COMPOSITION OF SAMPLES I, J AND K

| COMPOSITION | SAMPLE | | |
|---|---|---|---|
| | I | J | K |
| Aggregate | 75.9% | 75.9% | 75.9% |
| Water | 10.0% | 10.0% | 10.0% |

*Ordinary fly ash from Dayton Power Co., Dayton, Ohio.
**FA (fly ash) heated gradually to 500° C. and then quenched rapidly to room temperature.
***FA (fly ash) heated gradually to 800° C. and then quenched rapidly to room temperature.

TABLE 4

THE COMPRESSIVE STRENGTHS DEVELOPED

| SAMPLE | COMPRESSIVE STRENGTH | | Strength Increase |
|---|---|---|---|
| | 7 days | 28 days | |
| I | 1,273 psi | 1,560 psi | — |
| J | 1,560 psi | 1,910 psi | 22.4% |
| K | 1,623 psi | 2,100 psi | 34.6% |

Working Example 3: Lime—Fly Ash—Aggregates Mix

Quicklime—fly ash—aggregates mix was prepared and poured into mould. After the samples were hardened, the samples were cured in water bath. At the end of 7 days, a portion of samples was further autoclaved at 15 psi for 16 hours. The compositions of the samples and compressive strength developed are shown in Tables 5 and 6 respectively. From the results, it can be seen that the mix using quenched fly ash developed higher compressive strength. It further proves that quenching can improve the quality of fly ash used as construction material.

TABLE 5

COMPOSITION OF SAMPLES A, B AND C

| COMPOSITION | SAMPLE | | |
|---|---|---|---|
| | A | B | C |
| Lime | 4.5% | 4.5% | 4.5% |
| FA* | 12.4% | — | — |
| FA 500** | — | 12.4% | — |
| FA 800*** | — | — | 12.4% |
| Aggregates Max. ¾" | 73.0% | 73.0% | 73.0% |
| Water | 10.1% | 10.1% | 10.1% |

*Ordinary fly ash from Dayton Power Plant, Dayton, Ohio.
**FA (fly ash) gradually heated to 500° C. and then quenched rapidly to room temperature.
***FA (fly ash) gradually heated to 800° C. and then quenched rapidly to room temperature.

TABLE 6

COMPRESSIVE STRENGTHS DEVELOPED

| SAMPLE | COMPRESSIVE STRENGTH | |
|---|---|---|
| | 7 day | 28 day** |
| A | 194 psi | 640 psi |
| B | 194 psi | 780 psi |
| C | 350 psi | 780 psi |

**Cured 7 days and autoclaved at 15 psi for 15 hours.

Referring next to FIG. 7 schematic of the fly ash and reactive material forming a cementitious product, the fly ash particles which are indicated by reference numeral 180 have a series of cracks 182 which provide access to subjacent layer 184 with which the surrounding material 186 consists essentially of the reaction product between the constituents of fly ash and lime or lime from Linfan 188, Linvein, or Portland cement to form interlock and the usual gravel 197. Because of the unique mechanical interlocking and diffusion of lime through the particles to the subjacent layer 184, there is an efficient chemical reaction between the two materials producing, by reason of the exthothermic reaction a fast curing material and, therefore, sets in a relatively short period of time because of the more efficient interaction between the reactive materials. The result is greater early and final strength of the product. The unique mechanical interlock in the final product improves mechanical strength, particularly in compression as indicated in the foregoing working examples.

Although the present invention has been illustrated and described in connection with a few selected example embodiments, it will be understood that these are illustrative of the invention and are by no means restrictive thereof. It is reasonably to be assumed that those skilled in this art can make variations of the invention and it is intended that such revisions will be included within the scope of the following claims.

What I claim is:

1. An apparatus for producing finely divided and fractured fly ash comprising means for heating fly ash to elevated temperatures, means for thereafter quenching the heated fly ash particles by rapid quenching operation sufficient to effect thermal fracturing of the outer layers thereof and including means for providing a finely divided flow of such heated particles of fly ash, said last mentioned means including means for subdividing said fly ash particles into a continuous thin stream, and concurrently cooling such steams to effect theremal quenching of the particles.

2. An apparatus in accordance with claim 1 including means for collecting the rapidly quenched and thermally fractured fly ash following the cooling thereof.

3. An apparatus in accordance with claim 2 wherein said means for producing a finely divided flow of heated fly ash comprises an inclined support member, and means for oscillating said support member while the particles are longitudinally advanced thereon and consisting of an electromagnetic means for effecting oscillation by intermittent activation of said electromagnetic means, and a spring means opposing said electromagnetic means to produce oscillation of the member as the particles are advanced on the surface thereof.

4. An apparatus in accordance with claim 1 in which the means for providing a finely divided flow is in the form of a current of cool air which mixes the air and particles together within a narrow constriction to effect rapid mixing of the fly ash particles which are subsequently quenched rapidly.

5. An apparatus in accordance with claim 1 in which the means for effecting a finely divided flow of said fly ash during quenching consists of a continuously movable belt, means for spreading the heated fly ash uniformly over the surface, and means in the form of spaced cooling coils which define cooling chamber on each side of said belt to effect rapid quenching of the fly ash as it passes on said belt from one end of the quenching chamber to the other.

* * * * *